(12) United States Patent
Yang et al.

(10) Patent No.: US 10,649,953 B2
(45) Date of Patent: May 12, 2020

(54) BLOCKCHAIN-BASED DATA MIGRATION METHOD AND APPARATUS

(71) Applicant: Alibaba Group Holding Limited, George Town (KY)

(72) Inventors: Xinying Yang, Hangzhou (CN); Shifeng Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/427,032

(22) Filed: May 30, 2019

(65) Prior Publication Data
US 2019/0370223 A1    Dec. 5, 2019

(30) Foreign Application Priority Data

May 31, 2018    (CN) .......................... 2018 1 0553077

(51) Int. Cl.
| | |
|---|---|
| *G06F 16/10* | (2019.01) |
| *G06F 16/11* | (2019.01) |
| *G06F 16/182* | (2019.01) |
| *G06F 16/176* | (2019.01) |
| *G06F 16/17* | (2019.01) |

(Continued)

(52) U.S. Cl.
CPC ........ *G06F 16/119* (2019.01); *G06F 16/1734* (2019.01); *G06F 16/1767* (2019.01); *G06F 16/1844* (2019.01); *H04L 9/0643* (2013.01); *H04L 9/0816* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2006/0288048 A1* | 12/2006 | Kamohara | ............ G06F 16/119 |
| 2010/0332401 A1* | 12/2010 | Prahlad | ................. G06F 3/0649 |
| | | | 705/80 |

(Continued)

FOREIGN PATENT DOCUMENTS

| | | |
|---|---|---|
| CN | 106598500 | 4/2017 |
| CN | 107145521 | 9/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Kristopher Andersen
(74) *Attorney, Agent, or Firm* — Fish & Richardson P.C.

(57) ABSTRACT

A latest block associated with a blockchain is received at a blockchain node device, where the blockchain node device includes a first storage system and a second storage system, and where the second storage system is interconnected with the first storage system. The latest block is stored at the blockchain node device and in the first storage system. Whether a migration trigger event for block data stored in the first storage system is detected determining by the blockchain node device. The block data stored in the first storage system and exists prior to a migration reference time is migrated to the second storage system.

17 Claims, 4 Drawing Sheets

(51) Int. Cl.
*H04L 9/06* (2006.01)
*H04L 9/08* (2006.01)

(56) References Cited

U.S. PATENT DOCUMENTS

2017/0031676 A1* 2/2017 Cecchetti .................. G06F 8/65
2017/0221052 A1 8/2017 Sheng et al.
2019/0036778 A1* 1/2019 Bathen ................ H04L 41/0893

FOREIGN PATENT DOCUMENTS

| CN | 107193500 | 9/2017 |
|----|-----------|--------|
| CN | 107577427 | 1/2018 |
| CN | 108519862 | 9/2018 |
| TW | I461929 | 11/2014 |
| TW | I521359 | 2/2016 |
| TW | I610166 | 1/2018 |
| WO | WO 2018086015 | 5/2018 |

OTHER PUBLICATIONS

Nakamoto, "Bitcoin: A Peer-to-Peer Electronic Cash System," www.bitcoin.org, 2005, 9 pages.
Blog.ethereum.org [online], On Public and Private Blockchains, Aug. 6, 2015, retrieved on Aug. 7, 2019, retrieved from URL<https://blog.ethereum.org/2015/08/07/on-public-and-private-blockchains/>, 4 pages.
PCT International Search Report and Written Opinion in International Application No. PCT/US2019/034256, dated Jul. 22, 2019, 25 pages.

* cited by examiner

BLOCKCHAIN-BASED DATA MIGRATION METHOD AND APPARATUS

CROSS-REFERENCE TO RELATED APPLICATIONS

This application claims priority to Chinese Patent Application No. 201810553077.X, filed on May 31, 2018, which is hereby incorporated by reference in its entirety.

TECHNICAL FIELD

The present specification relates to the field of network communications technologies, and in particular, to a blockchain-based data migration method and apparatus.

BACKGROUND

The blockchain technology is also referred to as the distributed account book technology, and is an emerging technology in which computing devices jointly participate in "accounting" and jointly maintain a complete distributed database. The blockchain technology is characterized by decentralization, openness, and transparency. Each computing device can participate in database recording as a blockchain node device, and data synchronization can be quickly performed between computing devices. Each blockchain node device usually needs to process a high-concurrency consensus, verification, and read/write operation in a blockchain system. With an increase in the number of "accounting" blocks, incremental block data storage gradually affects a memory response speed, and further affects response efficiency of the node device to the high-concurrency consensus, verification, and read/write operation.

SUMMARY

To resolve the previous problem, the present specification provides a blockchain-based data migration method. The method is used by a blockchain node device to store data, a storage architecture of the blockchain node device includes a first storage system and a second storage system interconnected with the first storage system, and the method includes: receiving the latest block of a blockchain, and storing the latest block in the first storage system; determining whether a migration trigger event for block data stored in the first storage system is detected; and migrating block data that is stored in the first storage system and that exists before migration reference time to the second storage system in response to the detected migration trigger event.

Preferably, the first storage system is a centralized storage system, and the second storage system is a distributed storage system that includes cluster nodes.

Preferably, the determining whether a migration trigger event for block data stored in the first storage system is detected includes: determining whether specified data stored in the first storage system satisfies a predetermined data migration trigger rule; and if yes, determining that the migration trigger event for the block data stored in the first storage system is detected.

Preferably, the data migration trigger rule includes: a data capacity of the specified data stored in the first storage system exceeds a predetermined threshold; or a capacity ratio of a data capacity of the specified data stored in the first storage system to a total data capacity of the first storage system exceeds a predetermined threshold.

Preferably, the specified data includes one or more of total data, transaction digest value data, block digest value data, and historical status data in the block.

Preferably, the migrating block data that is stored in the first storage system and that exists before migration reference time to the second storage system in response to the detected migration trigger event includes: invoking a data migration utility in the blockchain to migrate the block data that is stored in the first storage system and that exists before the migration reference time to the second storage system, in response to the detected migration trigger event for the block data stored in the first storage system.

Preferably, the determining whether a migration trigger event for block data stored in the first storage system is detected includes: determining whether a migration instruction for the block data stored in the first storage system is received; and if yes, determining that the migration trigger event for the block data stored in the first storage system is detected.

Preferably, the migration instruction includes the specified data migration reference time.

Preferably, the second storage system includes a coordinator node and storage cluster nodes, and the coordinator node is configured to coordinate allocation of the block data that is of the blockchain and that is migrated to the second storage system to the storage cluster nodes of the second storage system.

Preferably, the coordinating allocation of the block data that is of the blockchain and that is migrated to the second storage system to the storage cluster nodes of the second storage system includes: successively allocating the block data that is of the blockchain and that is migrated to the second storage system to the storage cluster nodes of the second storage system.

Preferably, the coordinating allocation of the block data that is of the blockchain and that is migrated to the second storage system to the storage cluster nodes of the second storage system includes: migrating the block data that is of the blockchain and that is migrated to the second storage system to a first storage cluster node of the second storage system in ascending order of block heights; migrating remaining block data to a second storage cluster node of the second storage system in ascending order of block heights when a storage capacity of the first storage cluster node exceeds a predetermined capacity threshold; migrating remaining block data to a third storage cluster node of the second storage system in ascending order of block heights when a storage capacity of the second storage cluster node exceeds the predetermined capacity threshold; and so on.

Preferably, the blockchain is a consortium chain.

Preferably, the determining whether a migration trigger event for block data stored in the first storage system is detected; and migrating block data that is stored in the first storage system and that exists before migration reference time to the second storage system in response to the detected migration trigger event includes: invoking a smart contract corresponding to data migration of the blockchain, and executing data migration logic claimed in the smart contract, to migrate the block data that is stored in the first storage system and that exists before the migration reference time to the second storage system.

Correspondingly, the present specification further provides a blockchain-based data migration apparatus. The apparatus is used by a blockchain node device to store data, a storage architecture of the blockchain node device includes a first storage system and a second storage system interconnected with the first storage system, and the apparatus includes: an acquisition unit, configured to receive the latest block of a blockchain, and store the latest block in the first storage system; a determining unit, configured to determine whether a migration trigger event for block data stored in the first storage system is detected; and a migration execution unit, configured to migrate block data that is stored in the first storage system and that exists before migration reference time to the second storage system in response to the detected migration trigger event.

Preferably, the first storage system is a centralized storage system, and the second storage system is a distributed storage system that includes cluster nodes.

Preferably, the determining unit is specifically configured to: determine whether specified data stored in the first storage system satisfies a predetermined data migration trigger rule; and if yes, determine that the migration trigger event for the block data stored in the first storage system is detected.

Preferably, the determining unit is specifically configured to: determine whether a migration instruction for the block data stored in the first storage system is received; and if yes, determine that the migration trigger event for the block data stored in the first storage system is detected.

Preferably, the second storage system includes a coordinator node and storage cluster nodes, and the coordinator node is configured to coordinate allocation of the block data that is of the blockchain and that is migrated to the second storage system to the storage cluster nodes of the second storage system.

Preferably, the blockchain is a consortium chain.

Preferably, the determining unit and the migration execution unit are specifically configured to: invoke a smart contract corresponding to data migration of the blockchain, and execute data migration logic claimed in the smart contract, to migrate the block data that is stored in the first storage system and that exists before the migration reference time to the second storage system.

The present specification further provides a computer device, including a memory and a processor. The memory stores a computer program that can be run by the processor, and the processor performs the steps of the previous blockchain-based data migration method when running the computer program.

The present specification further provides a computer-readable storage medium. The computer-readable storage medium stores a computer program, and the steps of the previous blockchain-based data migration method are performed when the computer program is run by a processor.

The blockchain-based data migration method and apparatus, the computer device, and the computer-readable storage medium that are provided above in the present specification are used by a blockchain node device to store data. Under triggering of a related migration trigger event, existing block data that is in a first storage system for processing a blockchain service and that exists before migration reference time is migrated to a second storage system, to release more storage space for the first storage system, so that the first storage system can more optimally perform various data operations generated on a blockchain, such as a high-concurrency consensus, verification, and read/write operation. Due to a tamper-resistance mechanism of the blockchain, data that has been recorded in a historical block cannot be deleted or modified, and data cannot be added to the historical block, and therefore only a read operation can be performed on the block data migrated to the second storage system. Therefore, a hardware device resource with a relatively low performance configuration can be selected to deploy the second storage system, to reduce system costs.

DESCRIPTION OF IMPLEMENTATIONS

The "blockchain" described in the implementations provided in the present specification can be specifically a P2P network system that is achieved by node devices by using a consensus mechanism and that has a distributed data storage structure. Data in the blockchain is distributed in "blocks" that are connected to each other in terms of time. A current block includes a data digest of a previous block, and data of all or some nodes is completely backed up based on a specific consensus mechanism (for example, POW, POS, DPOS, or PBFT).

Each node device (especially, a full node device) of the blockchain usually needs to process a high-concurrency consensus, verification, and read/write operation in the blockchain system. With an increase in the number of "accounting" blocks, incremental block data storage gradually affects a memory response speed, and further affects response efficiency of the node device to the high-concurrency consensus, verification, and read/write operation. The present specification aims to provide a blockchain-based data migration method or apparatus, to migrate a historical block from a first storage system of a node device to a second storage system, so that the first storage system can be used for the previous high-concurrency consensus, verification, and read/write operation.

Figure 1:
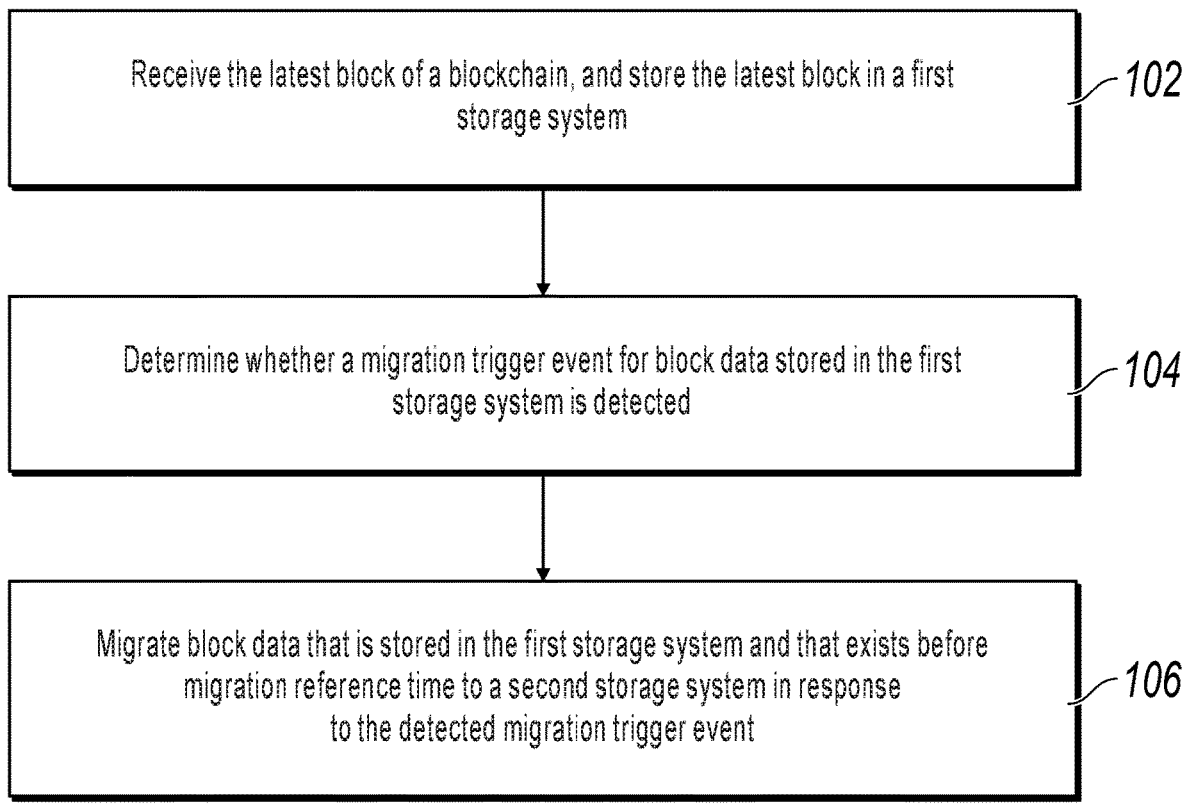
FIG. 1 is a flowchart illustrating a blockchain-based data migration method, according to an example implementation of the present specification.

FIG. 1 is a flowchart illustrating a blockchain-based data migration method, according to an example implementation of the present specification. A storage architecture of a blockchain node device includes a first storage system and a second storage system interconnected with the first storage system. The method includes the following steps:

Step 102: Receive the latest block of a blockchain, and store the latest block in the first storage system of the node device.

Step 104: Determine whether a migration trigger event for block data stored in the first storage system is detected.

Step 106: Migrate block data that is stored in the first storage system, and that exists before migration reference time to the second storage system in response to the detected migration trigger event, where the second storage system is a distributed storage system that includes cluster nodes.

The first storage system described in the present specification is a storage system that is connected to a blockchain network, and that is configured to perform any data operation (including a consensus, verification, and read/write operation) on the blockchain. To satisfy a multi-node and high-concurrency service requirement of the blockchain, a centralized storage architecture with a relatively high-performance configuration (such as high bandwidth, a high processing rate, and a large capacity) is usually selected as the first storage system. The centralized storage architecture can be a single high-performance host, a distributed architecture in which a single high-performance host is used as a central node for centralized processing, and a shared disk-based SMP architecture of multiple high-performance hosts. With an increase in the number of blocks packaged on the blockchain, remaining storage space of the first storage system decreases gradually. Accordingly, data processing capability such as a block data consensus, verification, and read/write processing capability of the first storage system gradually decreases. It is worthwhile to understand that the first storage system described in the present specification is not limited to the centralized storage architecture. Any storage system that is capable of storing and processing data and various services on the blockchain, such as a distributed storage system, can be referred to as the first storage system.

The second storage system described in the present specification is a storage system that is connected to the first storage system, and that receives data migrated from the first storage system to share storage pressure of the first storage system. A person skilled in the art knows that because the blockchain system runs in a corresponding consensus mechanism, data that has been recorded in a blockchain database is difficult to be tampered with by a random node. For example, to tamper existing data on a blockchain that uses a POW consensus mechanism, an attack of at least 51% of a total hash rate is needed. Therefore, the blockchain system is characterized by incomparable data security insurance, anti-attack, and tamper-resistance. An existing block that is recorded in each blockchain node device by consensus cannot be tampered with, and therefore only a read operation can be performed on the existing block. Therefore, a distributed storage system is usually selected as the second storage system that receives an existing block migrated from the first storage system. The distributed storage system can include multiple cluster nodes with relatively low-performance configurations, and is configured to store only an existing block of the blockchain. For example, the second storage system can be a storage system of a Shared Nothing-based MPP architecture.

The block data that exists before the migration reference time is migrated to the second storage system based on the detected migration trigger event for the block data stored in the first storage system. The block data described in the implementations of the present specification includes the entire data in blocks of the blockchain. When index data created for all data in each block is further specified in the blockchain database, the block data should further include the index data corresponding to each block. The index data usually includes content such as a block digest value (hash value) index, a transaction digest value (hash value) index, and a historical transaction status data index for each block. Historical transaction status data is a historical value of a transaction status on the blockchain, for example, a total balance value of an on-chain account corresponding to a specific block. Therefore, the block data migration described in the present specification can include overall migration of all data in a block and further include migration of index data corresponding to the block with the block. The migration reference time can be physical time, for example, a specific moment or timestamp, or can be logical time, namely, a logical value that has a positive correlation with the physical time. When data of each block is packaged and recorded on the blockchain, a timestamp of the moment is also recorded. Therefore, a block height value of the blockchain is logical data that has a positive correlation with the physical time, and the block height value is the logical time.

According to the blockchain-based data migration method provided in the previous implementation, when triggered by a related migration trigger event, existing block data that is in a first storage system for processing a blockchain service and that exists before migration reference time is migrated to a second storage system, to release more storage space for the first storage system, so that the first storage system can more optimally perform various data operations generated on a blockchain, such as a high-concurrency consensus, verification, and read/write operation. Due to a tamper-resistance mechanism of the blockchain, data that has been recorded in a historical block cannot be deleted or modified, and data cannot be added to the historical block, and therefore only a read operation can be performed on the block data migrated to the second storage system. Therefore, a hardware device resource with a relatively low-performance configuration can be selected to deploy the second storage system, to reduce system costs.

The second storage system described in the present specification is a distributed storage system that includes several cluster nodes. In the present specification, a specific architecture type of the first storage system or the second storage system is not limited. Any technical solution of migrating block data of a blockchain from a first storage system to a second storage system in consideration of processing rate improvement or cost reduction shall fall within the protection scope of the present specification.

In an implementation shown in the present specification, the blockchain can be specifically a consortium chain formed by organizations used as consortium members. A consensus mechanism selected for the consortium chain is relatively flexible, and the time for confirming transaction data on the chain is relatively short. Therefore, a block generation rate of the consortium chain is faster than that of a public chain (for example, a bitcoin blockchain). In addition, because a consortium node of the consortium chain participates in the accounting of blocks, the consortium node needs to process a high-concurrency consensus, verification, and transaction data write operation. Therefore, compared with a common node (a light node) on the consortium chain, a service processing operation of the consortium member node imposes a higher requirement on a storage system of the consortium member node. The blockchain-based data migration method described in the previous implementation is more applicable to the consortium member node of the consortium chain.

It is worthwhile to note that a target transaction (transfer) described in the present specification means that a user creates a piece of data by using a client of a blockchain, and finally publishes the data to a distributed database of the blockchain. Transactions on the blockchain include both the narrow-sense transaction and the broad-sense transaction. The narrow-sense transaction is a value transfer published by the user to the blockchain. For example, in a conventional bitcoin blockchain network, a transaction can be a transfer initiated by the user on the blockchain. The broad-sense transaction means that the user publishes service data to the blockchain with a service intention. For example, an operator can establish a consortium chain based on an actual service requirement, and deploy some other types of value transfer-unrelated online services (such as a rental service, a vehicle scheduling service, an insurance claims service, a credit service, and a medical service) based on the consortium chain. In such a consortium chain, a transaction can be that the user publishes a service message or a service request to the consortium chain for a service intention.

In an implementation shown in the present specification, the determining whether a migration trigger event for block data stored in the first storage system is detected includes: determining whether specified data in the block data stored in the first storage system satisfies a predetermined data migration trigger rule. Specifically, the data migration trigger rule can include that a data capacity of the specified data in the block data stored in the first storage system is greater than a predetermined threshold; or that a capacity ratio of a data capacity of the specified data in the block data stored in the first storage system to a total data capacity of the first storage system is greater than a predetermined threshold. Based on a type of data included in the block data, the specified data used for trigger rule determining can include one or more of total data, transaction digest value data, block digest value data, and historical status data in the block.

For example, whether a total data capacity of existing blocks of the blockchain in the first storage system exceeds the predetermined threshold is queried. If yes, a migration operation is initiated, to migrate the block data that is stored in the first storage system and that exists before the migration reference time to the second storage system. The block data here includes total data of each block or total data of each block and index data related to the total data of each block. When the migration reference time is a specific block height value, migration of block data that exists before the block height value can be directly initiated. When the migration reference time is a specific physical time (for example, time point or timestamp), the physical time can be converted into a specific block height value, and then migration of bock data that exists before the block height value is initiated.

For another example, when related index data is further specified in the blockchain database, for a blockchain that uses a transaction as a main service form, whether a capacity of the transaction digest value data of the blockchain in the first storage system exceeds the threshold or whether a capacity ratio of the transaction digest value data to the total data capacity of the first storage system exceeds the predetermined threshold is queried. If yes, a migration operation is initiated, to migrate the block data that is stored in the first storage system and that exists before the migration reference time to the second storage system. Similarly, other specified data in the blockchain database can also be used as a monitoring object specified in the migration trigger rule. For example, a capacity or capacity ratio of the previous historical status data is monitored, to trigger a migration operation.

The data migration trigger rule and the migration trigger operation are usually specified and executed by a computer program. It can be understood that an execution program that the data migration trigger rule is specified for can be deployed inside the blockchain node device to monitor a storage status of the first storage system, so that the execution program can be executed based on the migration trigger rule; or can be deployed in a distributed account book of the blockchain, so that the execution program can be invoked and executed in a form of a smart contract. A data migration rule (or data migration logic) that is applicable to some or all node devices of the blockchain can be claimed in the smart contract. In particular, for consortium nodes of a consortium chain, a data migration rule (or data migration logic) that is applicable to multiple consortium members can be deployed on the blockchain in the form of the smart contract. When the data in the first storage system satisfies the migration trigger logic claimed in the previous smart contract, the smart contract automatically triggers data migration.

It is worthwhile to note that, when the computer program performs the corresponding migration operation in response to the detected migration trigger event for the block data stored in the first storage system, the computer program can invoke a data migration utility in the blockchain to migrate the block data that is stored in the first storage system and that exists before the migration reference time to the second storage system. A migration instruction of the invoked data migration utility can include content such as an identifier of a source storage system (for example, an identifier of the first storage system), an identifier of a target storage system (for example, an identifier of the second storage system), a migrated-data type (for example, a block, a transaction digest value, a block digest value, or historical status data), and a migration boundary threshold (for example, a migrated-block height threshold determined based on the migration reference time). For example:

Migrate epoch1 block 1000000 to epoch0 (epoch 1 is the first storage system, epoch 0 is the second storage system, the migrated-data type is a block, and the migration boundary threshold is 1000000).

Compared with a case in which an external program of the blockchain is invoked to perform the block data migration operation, when the data migration utility program in the blockchain database is used to perform the data migration operation, the blockchain system can more easily learn a location and a query path of migrated data, thereby facilitating a subsequent read operation.

In another shown implementation, the determining whether a migration trigger event for block data stored in the first storage system is detected includes: determining whether a migration instruction for the block data stored in the first storage system is received; and if yes, determining that the migration trigger event for the block data stored in the first storage system is detected. "Migration instruction" can be implemented in multiple ways. For example, the instruction can be a migration instruction that is actively entered based on an existing status of the first storage system by a user of the blockchain node device that the first storage system is located in, or can be a migration instruction that is triggered after the blockchain node device invokes some other system programs or a related smart contract program. This is not limited in the present specification. Alternatively, the migration instruction can be a migration instruction that is triggered when the data migration utility in the blockchain is invoked. Details are omitted here. It is worthwhile to note that the migration instruction can include the data migration reference time, to explicitly migrate block data that satisfies a data migration reference time requirement to the second storage system.

Because the block data is migrated from the first storage system to the second storage system in an incremental migration mode, in other words, an amount of stored data migrated from the first storage system to the second storage system gradually increases with time, the second storage system should predetermine some storage rules, to read the stored block data in a relatively optimized way.

Figure 2:
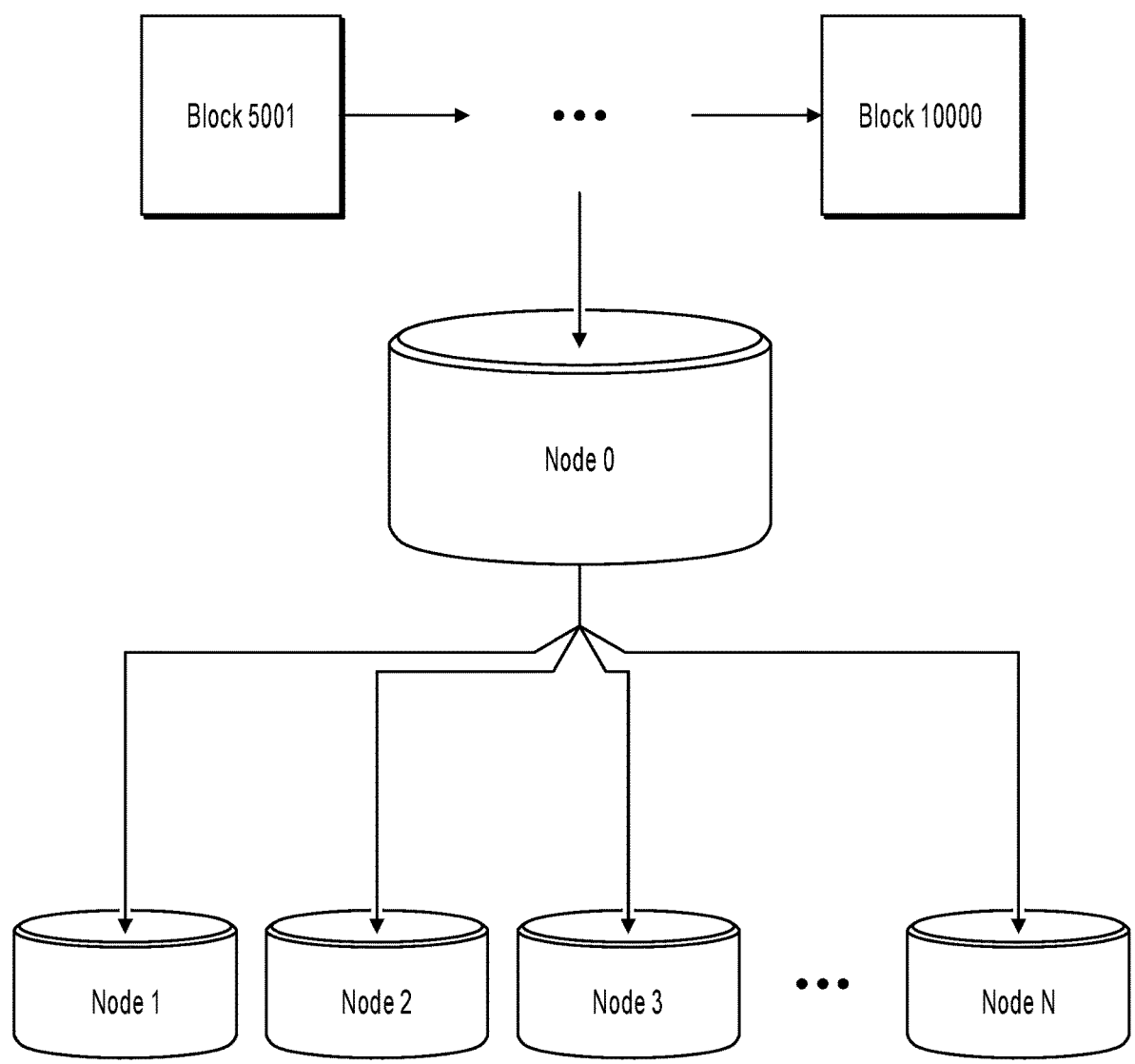
FIG. 2 is a schematic diagram illustrating data allocation in a second storage system, according to an example implementation of the present specification.

FIG. 2 is a schematic diagram illustrating the allocation of the migrated block data in the second storage system, according to an example implementation of the present specification. In this implementation, the blockchain is a consortium chain architecture, and the consortium chain has M consortium members. In the consortium chain, the M consortium members are responsible for verifying on-chain data based on a consensus mechanism of the consortium chain, and recording data that conforms to a consensus result in blocks of the consortium chain. The first storage system and the second storage system are corresponding to a node device that consortium member A of the consortium chain is located. The first storage system is configured to store and process related data of consortium member A of the blockchain, including but not limited to performing concurrent read/write, consensus verification, recording, and accounting on the block data. After an execution program detects or a user manually detects a migration trigger event for the block data stored in the first storage system, blocks in the first storage system that exist before the migration reference time are migrated to the second storage system. If existing blocks in the first storage system start from height value 5001, blocks that exist before block height 10000 (migration reference time) are migrated to the second storage system.

The second storage system shown in FIG. 2 uses a Shared Nothing-based MPP architecture, and includes a coordinator node node 0 and storage cluster nodes node 1 to node N. To reduce system costs, a storage device with relatively low costs, or even a common PC, can be selected as a cluster node device of the second storage system. A way of allocating the migrated blocks to the cluster nodes of the second storage system can be specified by the coordinator node node 0 based on a specific service requirement. For example, the blocks (whose block heights are 5001 to 10000) of the blockchain that are migrated to the second storage system can be successively allocated to the cluster nodes of the second storage system. That is, a block whose block height is 5001 is allocated to node 1, a block whose block height is 5002 is allocated to node 2, a block whose block height is 5003 is allocated to node 3, and so on. In other words, a block whose height value is H is allocated to the [(H-5000) mod (N)]th cluster node.

In another shown implementation, because adjacent blocks in the consortium chain generally include interrelated service data, to facilitate reading of the interrelated service data, adjacent blocks can be stored in a same storage cluster node as many as possible, that is, the migrated block data is allocated to the cluster nodes of the second storage system in the following way: migrating the block data that is of the blockchain and that is migrated to the second storage system to node 1 of the second storage system in ascending order of block heights; migrating remaining blocks in the current migration operation to node 2 in ascending order of block heights when a storage capacity of node 1 exceeds a predetermined capacity threshold; migrating remaining blocks in the current migration operation to node 3 of the second storage system in ascending order of block heights when a storage capacity of node 2 exceeds the predetermined capacity threshold; and so on. The storage way further facilitates the reading of related historical service data by a user and further improves processing efficiency.

In the previous implementation, the coordinator node node 0 is configured to coordinate and record allocation of the blocks of the blockchain that are migrated to the second storage system to the storage cluster nodes of the second storage system. The previous recording method can be specifically establishing an index table that includes index content such as a block data storage location (namely, an identifier or a location of a cluster node device of the second storage system), block data content (or a block data type), a block height value, a transaction digest value (TX hash), or a block digest value (Block hash). After receiving a read instruction, the coordinator node node 0 parses the read instruction to obtain a corresponding index object, and obtains a block data storage location (namely, a cluster node device that the block data belong to) from the index table based on a value of the index object, to read content corresponding to the instruction from the cluster node device.

In the previous implementation provided in the present specification, each of the M consortium members processes a related service on the blockchain, and stores data that is obtained by the consortium members by consensus in the consortium chain. Each consortium member stores all data obtained after consensus verification in a node device corresponding to the consortium member. A consensus mechanism of the consortium chain is usually set to be relatively flexible, and a service or transaction corresponding to the consortium chain is usually a high-frequency event. Therefore, a storage resource with a large capacity and a high configuration needs to be provided. For consortium member A, when the quantity N of storage cluster nodes of the second storage system is far greater than the quantity M of members in the consortium chain, all data that is collected by the M member nodes on the chain can be distributed in the N cluster node devices for storage. It greatly relieves data storage and processing pressure of the first storage system of consortium member A.

It can be learned that, when each of node devices that are corresponding to most consortium members in the consortium chain or corresponding to members responsible for verifying and recording data uses the data migration method provided in the present specification to continuously migrate historical blocks to a corresponding second storage system with a relatively low configuration in response to a migration trigger event, to relieve pressure of a first storage system that is responsible for all operations such as data consensus, verification, and recording on the blockchain, processing efficiency such as a throughput of the entire consortium chain can be further improved on the premise of cost reduction. Therefore, to centrally manage block data migration of all the consortium node devices, a smart contract can be deployed on the consortium chain. Data migration logic that should be initiated when a migration trigger rule is satisfied can be claimed in the smart contract, so that each consortium party node device invokes the smart contract when a predetermined migration trigger rule is satisfied, to initiate the data migration logic claimed in the smart contract. The data migration logic can be the previous specific data migration method for migrating block data from a first storage system of a node device to a second storage system or can be a centralized data migration instruction. After receiving the data migration instruction, each consortium member node performs data migration based on a migration rule (including an allocation rule of migrated data in a second storage system) that is claimed in a migration program determined for each consortium member node, to ensure that each consortium member in the consortium chain system can effectively, continuously, and independently migrate historical block data, thereby improving service processing efficiency of the entire consortium chain.

It is worthwhile to note that a consensus algorithm and a specific consensus process that are used when the member node devices in the consortium chain perform consensus processing on transaction or service data released to the blockchain are not described in detail in the present specification. When implementing the technical solutions recorded in the present specification, a person skilled in the art can make references to recordings in related technologies.

Figure 4:
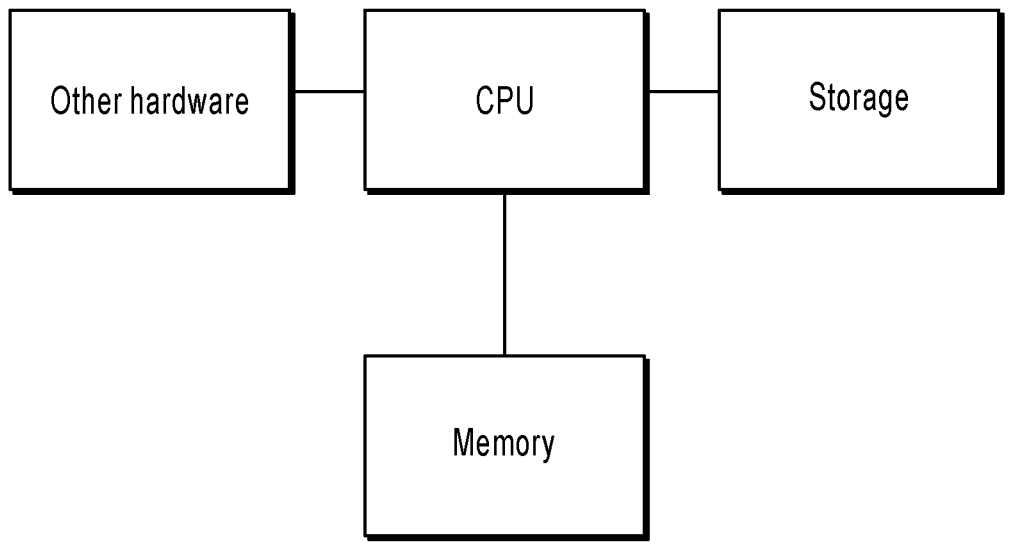
FIG. 4 is a structural hardware diagram illustrating an implementation of a blockchain-based data migration method or apparatus, according to the present specification.

Corresponding to the previous implementation procedure, an implementation of the present specification further provides a blockchain-based data migration apparatus. The apparatus can be implemented by software, can be implemented by hardware, or can be implemented by a combination of hardware and software. The software implementation is used as an example. As a logical apparatus, the apparatus is formed after a CPU (Central Processing Unit) in a device that the apparatus is located in reads a corresponding computer program instruction to memory for running. In terms of hardware implementation, in addition to a CPU, a memory, and storage that are shown in FIG. 4, the device that the blockchain-based data migration apparatus is located in usually further includes at least one of other hardware such as a chip for sending/receiving a radio signal, and a card for implementing a network communication function.

Figure 3:
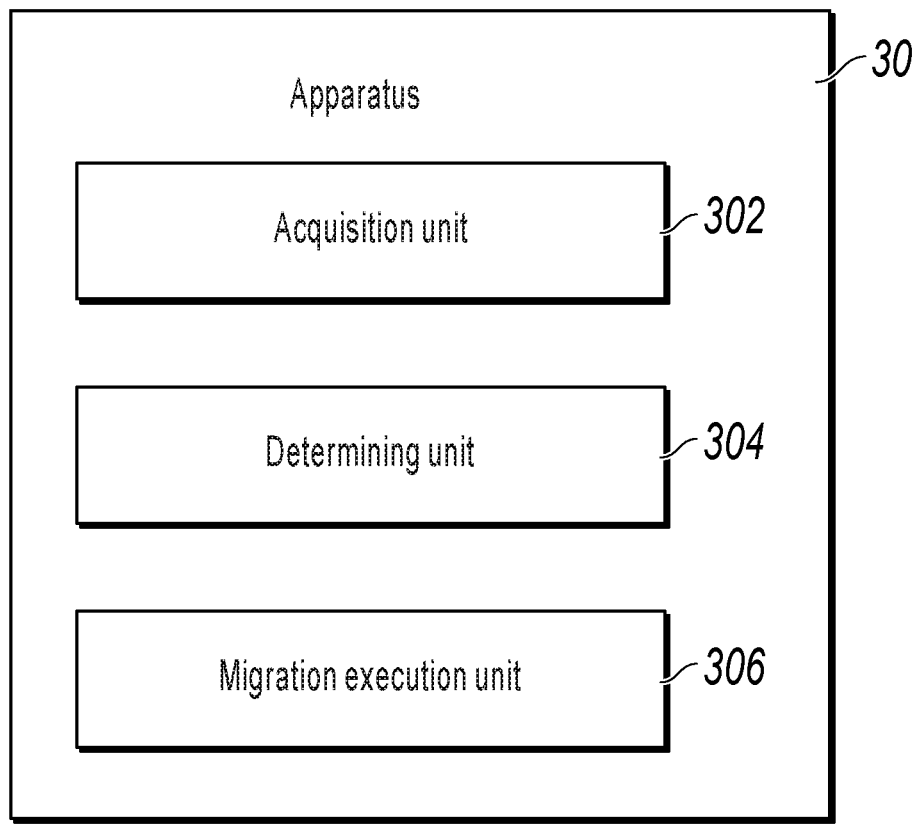
FIG. 3 is a schematic diagram illustrating a blockchain-based data migration apparatus, according to an example implementation of the present specification.

FIG. 3 shows a blockchain-based data migration apparatus 30 provided in the present specification. The apparatus 30 is used by a blockchain node device to store data, a storage architecture of the blockchain node device includes a first storage system and a second storage system interconnected with the first storage system, and the apparatus includes:

an acquisition unit 302, configured to receive the latest block of a blockchain, and store the latest block in the first storage system;

a determining unit 304, configured to determine whether a migration trigger event for block data stored in the first storage system is detected; and a migration execution unit 306, configured to migrate block data that is stored in the first storage system and that exists before migration reference time to the second storage system in response to the detected migration trigger event.

Preferably, the first storage system is a centralized storage system, and the second storage system is a distributed storage system that includes cluster nodes.

Preferably, the determining unit 304 is specifically configured to:

determine whether specified data stored in the first storage system satisfies a predetermined data migration trigger rule; and if yes, determine that the migration trigger event for the block data stored in the first storage system is detected.

Preferably, the determining unit 304 is specifically configured to:

determine whether a migration instruction for the block data stored in the first storage system is received; and if yes, determine that the migration trigger event for the block data stored in the first storage system is detected.

Preferably, the second storage system includes a coordinator node and storage cluster nodes, and the coordinator node is configured to coordinate the allocation of the block data that is of the blockchain and that is migrated to the second storage system to the storage cluster nodes of the second storage system.

Preferably, the blockchain is a consortium chain.

Preferably, the determining unit 302 and the migration execution unit 304 are specifically configured to invoke a smart contract corresponding to data migration of the blockchain and execute data migration logic claimed in the smart contract, to migrate the block data that is stored in the first storage system and that exists before the migration reference time to the second storage system.

For an implementation process of functions of the units in the apparatus, references can be made to an implementation process of the corresponding steps in the previous method. For related parts, references can be made to some descriptions in the method implementation. Details are omitted here.

The previous apparatus implementation is merely an example. The units described as separate parts may or may not be physically separate, and parts displayed as units may or may not be physical modules, in other words, can be located in one position, or can be distributed on multiple network modules. Some or all of the units or modules can be selected based on actual requirements to achieve the objectives of the solutions of the present specification. A person of ordinary skill in the art can understand and implement the implementations of the present application without creative efforts.

The apparatus and unit illustrated in the previous implementation can be specifically implemented by a computer chip or an entity, or can be implemented by a product with a certain function. A typical implementation device is a computer, and the computer can be specifically a personal computer, a laptop computer, a cellular phone, a camera phone, a smartphone, a personal digital assistant, a media player, a navigation device, an email sending/receiving device, a game console, a tablet computer, a wearable device, or any combination of these devices.

Corresponding to the previous method implementation, an implementation of the present specification further provides a computer device. The computer device includes a memory and a processor. The memory stores a computer program that can be run by the processor, and the processor performs the steps of the blockchain-based data migration method in the implementations of the present specification when running the stored computer program. For detailed descriptions of the steps of the blockchain-based data migration method, references can be made to the previous content. Details are not repeated.

Corresponding to the previous method implementation, an implementation of the present specification further provides a computer-readable storage medium. The storage medium stores a computer program, and the steps of the blockchain-based data migration method in the implementations of the present specification are performed when the computer program is run by a processor. For detailed descriptions of the steps of the blockchain-based data migration method, references can be made to the previous content. Details are not repeated.

The previous descriptions are merely example implementations of the present specification, but are not intended to limit the present specification. Any modification, equivalent replacement, improvement, etc. made without departing from the spirit and principle of the present specification shall fall within the protection scope of the present specification.

In a typical configuration, a computing device includes one or more processors (CPUs), an input/output interface, a network interface, and a memory.

The memory can include a non-persistent memory, a random access memory (RAM), a nonvolatile memory, and/or another form of memory in computer-readable media, for example, a read-only memory (ROM) or a flash random access memory (flash RAM). The memory is an example of a computer-readable medium.

The computer-readable medium includes persistent, non-persistent, movable, and unmovable media that can store information by using any method or technology. The information can be a computer-readable instruction, a data structure, a program module, or other data.

Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic disk memory or another magnetic storage device, or any other non-transmission medium that can be used to store information accessible to the computing device. Based on the definition in the present specification, the computer-readable medium does not include computer-readable transitory media (transitory media), such as a modulated data signal and carrier.

It is worthwhile to further note that, the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the implementations of the present application can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a magnetic disk memory, a CD-ROM, an optical memory, etc.) that include computer-usable program code.

What is claimed is:

1. A computer-implemented method, comprising:
    receiving, at a blockchain node device, a latest block associated with a blockchain, wherein the blockchain node device includes a first storage system and a second storage system, and wherein the second storage system is interconnected with the first storage system;
    storing, at the blockchain node device and in the first storage system, the latest block;
    determining, by the blockchain node device, whether a migration trigger event for blockchain data stored in the first storage system is detected, including determining whether the blockchain data stored in the first storage system satisfies a predetermined data migration rule, wherein the blockchain data includes at least one of total blockchain block data, transaction digest value data in each block, block digest value data in each block, or historical status data in a block that includes a historical value of transaction status on the blockchain, and wherein the predetermined data migration rule specifies a predetermined data capacity of the blockchain data stored in the first storage system or specifies a predetermined capacity ratio of the data capacity of the blockchain data stored in the first storage system relative to a total data capacity of the first storage system exceeds a predetermined threshold; and
    in response to a determination that the migration trigger event is detected, migrating, to the second storage system in an ascending order of block heights, the blockchain data stored in the first storage system and exists prior to a migration reference time.

2. The computer-implemented method of claim 1, wherein the first storage system is a centralized storage system, and wherein the second storage system is a distributed storage system including a coordinator node and a plurality of storage cluster nodes.

3. The computer-implemented method of claim 2, further comprising:
    successively allocating, by the coordinator node, blockchain data of the blockchain that is migrated to the plurality of storage cluster nodes of the second storage system.

4. The computer-implemented method of claim 3, wherein successively allocating the blockchain data comprises:
    migrating the blockchain data of the blockchain migrated to the second storage system to a first storage cluster node of the second storage system in an ascending order of block heights; and
    if a storage capacity of the first storage cluster node exceeds a predetermined capacity threshold, iteratively migrating remaining blockchain data to a next storage cluster node of the second storage system in ascending order of block heights.

5. The computer-implemented method of claim 1, wherein migrating blockchain data comprises invoking a data migration utility in the blockchain to migrate the blockchain data that is stored in the first storage system and that exists before the migration reference time to the second storage system.

6. The computer-implemented method of claim 1, wherein migrating blockchain data comprises:
    invoking a smart contract that triggers data migration in the blockchain; and
    executing data migration logic included in the smart contract to migrate the blockchain data that is stored in the first storage system and that exists before the migration reference time to the second storage system.

7. A non-transitory, computer-readable medium storing one or more instructions executable by a computer system to perform operations comprising:
    receiving, at a blockchain node device, a latest block associated with a blockchain, wherein the blockchain node device includes a first storage system and a second storage system, and wherein the second storage system is interconnected with the first storage system;
    storing, at the blockchain node device and in the first storage system, the latest block;
    determining, by the blockchain node device, whether a migration trigger event for blockchain data stored in the first storage system is detected, including determining whether blockchain data stored in the first storage system satisfies a predetermined data migration rule, wherein the blockchain data includes at least one of total blockchain block data, transaction digest value data in each block, block digest value data in each block, or historical status data in a block that includes a historical value of transaction status on the blockchain, and wherein the predetermined data migration rule specifies a predetermined data capacity of the blockchain data stored in the first storage system or specifies a predetermined capacity ratio of the data capacity of the blockchain data stored in the first storage system relative to a total data capacity of the first storage system exceeds a predetermined threshold; and
    in response to a determination that the migration trigger event is detected, migrating, to the second storage system in an ascending order of block heights, the blockchain data stored in the first storage system and exists prior to a migration reference time.

8. The non-transitory, computer-readable medium of claim 7, wherein the first storage system is a centralized storage system, and wherein the second storage system is a distributed storage system including a coordinator node and a plurality of storage cluster nodes.

9. The non-transitory, computer-readable medium of claim 8, further comprising:
successively allocating, by the coordinator node, blockchain data of the blockchain that is migrated to the plurality of storage cluster nodes of the second storage system.

10. The non-transitory, computer-readable medium of claim 9, wherein successively allocating the blockchain data comprises:
migrating the blockchain data of the blockchain migrated to the second storage system to a first storage cluster node of the second storage system in an ascending order of block heights; and
if a storage capacity of the first storage cluster node exceeds a predetermined capacity threshold, iteratively migrating remaining blockchain data to a next storage cluster node of the second storage system in ascending order of block heights.

11. The non-transitory, computer-readable medium of claim 7, wherein migrating blockchain data comprises invoking a data migration utility in the blockchain to migrate the blockchain data that is stored in the first storage system and that exists before the migration reference time to the second storage system.

12. The non-transitory, computer-readable medium of claim 7, wherein migrating blockchain data comprises:
invoking a smart contract that triggers data migration in the blockchain; and
executing data migration logic included in the smart contract to migrate the blockchain data that is stored in the first storage system and that exists before the migration reference time to the second storage system.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a blockchain node device, a latest block associated with a blockchain, wherein the blockchain node device includes a first storage system and a second storage system, and wherein the second storage system is interconnected with the first storage system;
storing, at the blockchain node device and in the first storage system, the latest block;
determining, by the blockchain node device, whether a migration trigger event for data stored in the first storage system is detected, including determining whether blockchain data stored in the first storage system satisfies a predetermined data migration rule, wherein the blockchain data includes at least one of total blockchain block data, transaction digest value data in each block, block digest value data in each block, or historical status data in a block that includes a historical value of transaction status on the blockchain, and wherein the predetermined data migration rule specifies a predetermined data capacity of the blockchain data stored in the first storage system or specifies a predetermined capacity ratio of the data capacity of the blockchain data stored in the first storage system relative to a total data capacity of the first storage system exceeds a predetermined threshold; and
in response to a determination that the migration trigger event is detected, migrating, to the second storage system in an ascending order of block heights, the blockchain data stored in the first storage system and exists prior to a migration reference time.

14. The computer-implemented system of claim 13, wherein the first storage system is a centralized storage system, and wherein the second storage system is a distributed storage system including a coordinator node and a plurality of storage cluster nodes.

15. The computer-implemented system of claim 14, further comprising:
successively allocating, by the coordinator node, blockchain data of the blockchain that is migrated to the plurality of storage cluster nodes of the second storage system.

16. The computer-implemented system of claim 15, wherein successively allocating the blockchain data comprises:
migrating the blockchain data of the blockchain migrated to the second storage system to a first storage cluster node of the second storage system in an ascending order of block heights; and
if a storage capacity of the first storage cluster node exceeds a predetermined capacity threshold, iteratively migrating remaining blockchain data to a next storage cluster node of the second storage system in ascending order of block heights.

17. The computer-implemented system of claim 13, wherein migrating blockchain data comprises invoking a data migration utility in the blockchain to migrate the blockchain data that is stored in the first storage system and that exists before the migration reference time to the second storage system.

* * * * *